(12) United States Patent
Wang

(10) Patent No.: US 12,517,179 B2
(45) Date of Patent: Jan. 6, 2026

(54) METHOD AND APPARATUS FOR CONTROLLING AN ELECTRONIC DEVICE

(71) Applicant: BEIJING XIAOMI MOBILE SOFTWARE CO., LTD., Beijing (CN)

(72) Inventor: Xingcheng Wang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 655 days.

(21) Appl. No.: 17/955,215

(22) Filed: Sep. 28, 2022

(65) Prior Publication Data
US 2024/0003977 A1     Jan. 4, 2024

(30) Foreign Application Priority Data
Jun. 30, 2022 (CN) .......................... 202210769217.3

(51) Int. Cl.
G01R 31/367 (2019.01)
G01R 31/382 (2019.01)

(52) U.S. Cl.
CPC .......... *G01R 31/367* (2019.01); *G01R 31/382* (2019.01)

(58) Field of Classification Search
CPC ..................... G01R 31/367; G01R 31/382
USPC ........................................ 320/136
See application file for complete search history.

(56) References Cited

U.S. PATENT DOCUMENTS

| 2015/0198996 | A1* | 7/2015 | Kliegman | G06F 1/3287 |
| | | | | 713/300 |
| 2016/0073351 | A1* | 3/2016 | Cardozo | H04W 52/0258 |
| | | | | 455/574 |
| 2021/0289067 | A1* | 9/2021 | Dellinger | H04W 12/06 |

OTHER PUBLICATIONS

European Patent Application No. 22198580.7, Search and Opinion dated Jun. 21, 2023, 11pages.

* cited by examiner

*Primary Examiner* — Nathaniel R Pelton
(74) *Attorney, Agent, or Firm* — Cozen O'Connor

(57) ABSTRACT

An electronic device includes a battery module. A method for controlling the electronic device includes obtaining an expected use duration of the electronic device; determining a scene mode of the electronic device; determining power consumption information of a scene corresponding to the scene mode, wherein the power consumption information of the scene describes a power consumption of the electronic device in the scene mode; and discharging the battery module based on the expected use duration and the power consumption information of the scene.

13 Claims, 6 Drawing Sheets

METHOD AND APPARATUS FOR CONTROLLING AN ELECTRONIC DEVICE

CROSS-REFERENCE TO RELATED APPLICATIONS

This application is based on and claims priority to the Chinese Patent Application No. 202210769217.3, filed on Jun. 30, 2022, the entire content of which is incorporated herein by reference.

TECHNICAL FIELD

The present disclosure relates to a field of electronic device technologies, and particularly to a method and an apparatus for controlling an electronic device, an electronic device and a storage medium.

BACKGROUND

With the popularization of electronic devices, battery life of the devices has become the focus of many users.

In related technologies, a built-in algorithm in an electronic device supports prediction of a residual use duration to determine the appropriate discharge control strategy for a battery module.

SUMMARY

A method for controlling an electronic device is provided. The electronic device includes a battery module, and the method includes: obtaining an expected use duration of the electronic device; determining a scene mode of the electronic device; determining power consumption information of a scene corresponding to the scene mode, in which the power consumption information of the scene describes a power consumption of the electronic device in the scene mode; and discharging the battery module based on the expected use duration and the power consumption information of the scene.

An electronic device includes: a battery module; at least one processor; and a memory communicatively connected to the at least one processor, in which, the memory is stored with instructions executable by the at least one processor, and the processor is configured to: obtain an expected use duration of the electronic device; determine a scene mode of the electronic device; determine power consumption information of a scene corresponding to the scene mode, in which the power consumption information of the scene describes a power consumption of the electronic device in the scene mode; and discharge the battery module based on the expected use duration and the power consumption information of the scene.

A non-transitory computer readable storage medium stored with computer instructions is provided. The computer instructions are configured to cause a computer to perform a method for controlling an electronic device as mentioned above.

BRIEF DESCRIPTION OF THE DRAWINGS

The above and/or additional aspects and advantages of the present disclosure may be apparent and more readily appreciated from the following descriptions made with reference to the drawings, in which.

DETAILED DESCRIPTION

Embodiments of the present disclosure are described in detail below, and examples of embodiments are illustrated in the accompanying drawings, in which the same or similar numerals represent the same or similar elements or elements with the same or similar functions. The embodiments described below with reference to the drawings are illustrative, are merely configured to explain the present disclosure and are not to be construed as a limitation of the present disclosure. On the contrary, embodiments of the present disclosure include all changes, modifications and equivalents falling into the spirit and scope of the appended claims.

Figure 1:
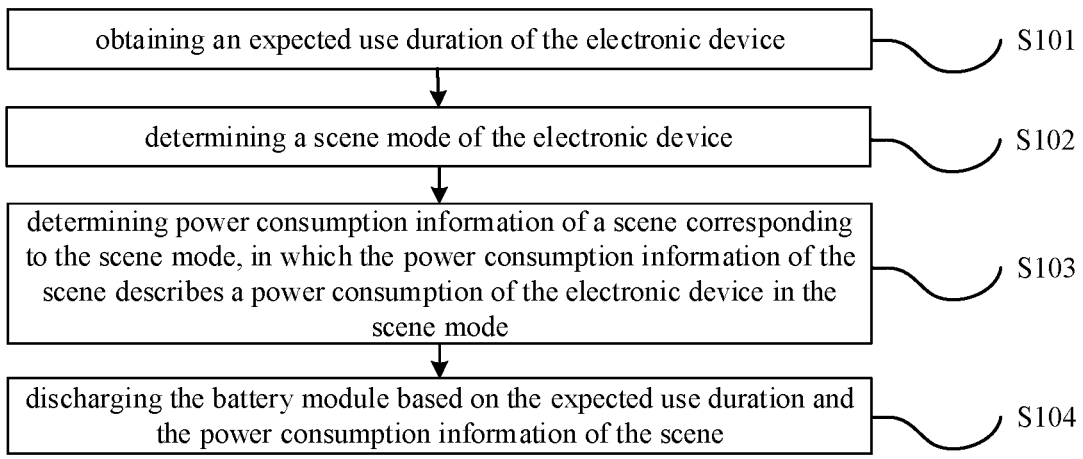
FIG. 1 is a flowchart of a method for controlling an electronic device provided in an embodiment of the present disclosure.

FIG. 1 is a schematic flowchart of a method for controlling an electronic device provided in an embodiment of the present disclosure.

It needs to be noted that, the executive body of the method for controlling the electronic device in the embodiment is an apparatus for controlling the electronic device, and the apparatus may be implemented by means of software and/or hardware and may be configured in the electronic device. The electronic device may include but is not limited to a terminal, a server side, etc. For example, the terminal may be a mobile phone, a handheld computer, etc. In some embodiments, the electronic device includes a battery module.

As illustrated in FIG. 1, the method for controlling the electronic device includes as follows:

At S101, an expected use duration of the electronic device is obtained.

The expected use duration may be a residual use duration of the electronic device expected by a user.

It can be understood that the electronic device in embodiments of the present disclosure include but are not limited to a mobile phone, a tablet, an electronic reader, a laptop, etc.

In some embodiments, in the process of obtaining the expected use duration of the electronic device, a data input interface corresponding to the expected use duration may be configured in the executive body in embodiments of the present disclosure in advance, so that the user may obtain the expected use duration of the electronic device via the data input interface.

Alternatively, in some embodiments, in the process of obtaining the expected use duration of the electronic device, a communication link between the executive body in embodiments of the present disclosure and a big data server may also be established in advance, and then the expected use duration of the electronic device is obtained from the big data.

In some embodiments, any other possible methods may be used to obtain the expected use duration of the electronic device, and there are no limitations on this.

In embodiments of the present disclosure, the expected use duration may effectively represent a residual use duration of the electronic device expected by the user when the expected use duration of the electronic device is obtained, and therefore a reliable reference for the subsequent discharge process of the battery module is provided.

At S102, a scene mode of the electronic device is determined.

The scene mode refers to a working mode of the electronic device in a current scene, such as a game mode, a video playing mode, a music playing mode, etc.

In embodiments of the present disclosure, in the process of determining the scene mode of the electronic device, a plurality of candidate scene modes may be configured in the executive body in the embodiments of the present disclosure in advance, and then a current scene mode of the electronic device may be determined from the plurality of candidate scene modes in response to a configuration instruction of the user. Alternatively, current process information of the electronic device may be obtained, the process information may be matched with the plurality of candidate scene modes, and a current scene mode of the electronic device is determined based on the matching result. There are no limitations on this.

It can be understood that power consumption information generated by the electronic device in different scene modes may be different. When the scene mode of the electronic device is determined, it is possible to provide a reliable retrieval basis for the subsequent determination of the power consumption information of a scene.

At S103, power consumption information of a scene corresponding to the scene mode is determined. The power consumption information of the scene describes a power consumption of the electronic device in the scene mode.

The power consumption information may be used to describe the relevant information of the corresponding power consumption of the electronic device. The power consumption information of the scene refers to the power consumption information generated by the electronic device in the scene mode.

The power consumption of the electronic device may refer to the consumption of electric power stored in the battery module of the electronic device.

In the embodiment of the present disclosure, in the process of determining the power consumption information of the scene corresponding to the scene mode, a correspondence list may be used, and the correspondence list may record the power consumption information of the scene suitable for the scene mode. Alternatively, a third-party power consumption assessment apparatus may also be used to obtain the relevant information of the electronic device in the scene mode, so as to obtain the power consumption information of the scene corresponding to the scene mode and transmit it to the executive body in the embodiment of the present disclosure, which is not limited.

For example, in the process of determining the power consumption information of the scene corresponding to the scene mode in the embodiment of the present disclosure, a discharge current I and a discharge voltage U of the battery module are obtained by a sensor when the electronic device is in the scene mode, and then a discharge power P corresponding to the battery module is obtained based on the formula $P=U*I$ as the power consumption information of the scene.

It can be understood that the power consumption information of the scene has a high correlation with the residual use duration of the electronic device in the corresponding scene mode. It is possible to provide reference data for discharging the battery module when the power consumption information of the scene corresponding to the scene mode is determined.

At S104, the battery module is discharged based on the expected use duration and the power consumption information of the scene.

The battery module refers to an electronic component pre-configured in the electronic device, which can provide energy for the operation of the electronic device. The battery module may be a lithium battery configured in a smart phone. In the embodiment of the present disclosure, the number of the battery modules may be one or more, which is not limited herein.

Discharging the battery module may refer to control measures adopted for discharging the battery module.

In an embodiment of the present disclosure, in the process of discharging the battery module based on the expected use duration and the power consumption information of the scene, a start time of the electronic device may be obtained, and then the battery module is discharged based on the start time, the expected use duration and the power consumption information of the scene. Alternatively, charging information of the battery module may be obtained, and then the battery module is discharged based on the charging information, the expected use duration and the power consumption information of the scene, which is not limited.

In an embodiment of the present disclosure, a battery module is effectively controlled when the battery module is discharged based on the expected use duration and power consumption information of the scene. Thus, an actual residual use duration of the electronic device is close to the expected use duration of the user.

In an embodiment of the present disclosure, an expected use time of the electronic device is obtained, and a scene mode of the electronic device is determined. Power consumption information of the scene corresponding to the scene mode is determined, and the power consumption information of the scene describes the power consumption of the electronic device in the scene mode. The battery module is discharged based on the expected use duration and the power consumption information of the scene. Therefore, the discharge effect of the battery module is effectively improved and a more accurate residual use duration is obtained.

Figure 2:
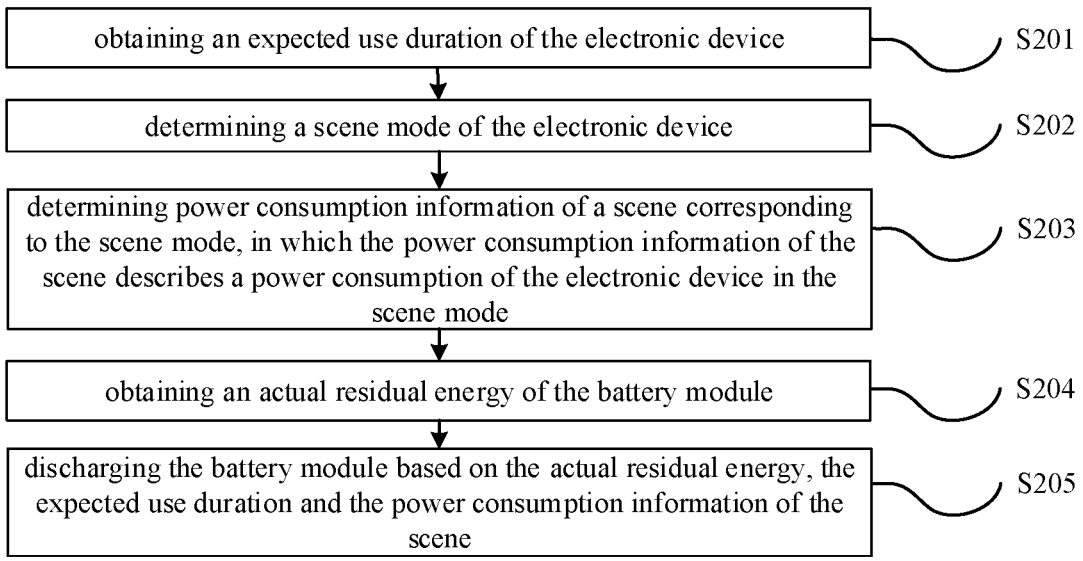
FIG. 2 is a flowchart of a method for controlling an electronic device provided in another embodiment of the present disclosure.

FIG. 2 is a schematic flowchart of a method for controlling an electronic device provided in another embodiment of the present disclosure.

As illustrated in FIG. 2, the method for controlling the electronic device includes as follows:

At S201, an expected use duration of the electronic device is obtained.

At S202, a scene mode of the electronic device is determined.

At S203, power consumption information of the scene corresponding to the scene mode is determined. The power consumption information of the scene describes a power consumption of the electronic device in the scene mode.

Regarding the explanation of S201 to S203, reference may be made to the above embodiments, which will not be repeated here.

At S204, an actual residual energy of the battery module is obtained.

The actual residual energy refers to residual electricity in the battery module at a current time point.

It can be understood that the actual residual energy has a high correlation with the residual use duration of the electronic device. It is possible to provide reliable reference data for subsequent discharge control process of the battery module when the actual residual energy of the battery module is obtained.

At S205, the battery module is discharged based on the actual residual energy, the expected use duration and the power consumption information of the scene.

In some embodiments, in the process of discharging the battery module based on the actual residual energy, the expected use duration and the power consumption information of the scene, discharge amount per unit time may be determined based on the actual residual energy and the expected use duration, and then the battery module is discharged based on the discharge amount per unit time and the power consumption information of the scene.

Alternatively, in some embodiments, in the process of discharging the battery module based on the actual residual energy, the expected use duration and the power consumption information of the scene, a reference residual energy may be determined based on the expected use duration and the power consumption information of the scene, and then the battery module is discharged based on the actual residual energy and the reference residual energy.

In some embodiments, any other possible methods may be used to discharge the battery module based on the actual residual energy, the expected use duration and the power consumption information of the scene, which is not limited herein.

For example, in some embodiments, in the process of discharging the battery module based on the expected use duration T and the actual residual energy Q, the battery module may be discharged based on the formula $P1=Q/T$, where P1 is the discharge power of the battery module after discharge control.

Alternatively, in some embodiments, in the process of discharging the battery module based on the actual residual energy, the expected use duration and the power consumption information of the scene, an actual use duration of the electronic device may be determined based on the actual residual energy and the power consumption information of the scene, and the battery module may be discharged based on the expected use duration, the actual use duration and the power consumption information of the scene. Therefore, the actual use duration obtained may effectively represent the use duration of the electronic device corresponding to the power consumption information of the scene, so as to determine whether to adjust the power consumption information of the scene in combination with the expected use duration, so as to effectively improve the reliability of the discharge control process.

The actual use duration refers to a use duration of the electronic device supported by the actual residual energy based on the power consumption information of the scene.

For example, the actual use duration T2 may be obtained based on the formula $T2=Q/P$. It is possible to determine whether the current power consumption information of the electronic device for the scene meets the user's expectations by comparing the expected use duration with the actual use duration, so as to formulate the corresponding power consumption control strategy.

That is, in the embodiment of the present disclosure, the actual residual energy of the battery module may be determined after the power consumption information of the scene corresponding to the scene mode is determined, and the battery module is discharged based on the actual residual energy, the expected use duration and the power consumption information of the scene. Therefore, to adapt to the personalized application scene, the actual residual energy of the battery module may be effectively combined in the discharge control process, so as to effectively improve the accuracy of the discharge control process.

In an embodiment of the present disclosure, the actual residual energy of the battery module is obtained, and the battery module is discharged based on the actual residual energy, the expected use duration and the power consumption information of the scene. Therefore, to adapt to the personalized application scene, the actual residual energy of the battery module may be effectively combined in the discharge control process, so as to effectively improve the accuracy of the discharge control process. The actual use duration of the electronic device is determined based on the actual residual energy and the power consumption information of the scene, and the battery module is discharged based on the expected use duration, the actual use duration and the power consumption information of the scene. Therefore, the actual use duration obtained may effectively represent the use duration of the electronic device corresponding to the power consumption information of the scene, so as to determine whether to adjust the power consumption information of the scene in combination with the expected use duration. Therefore, the reliability of the discharge control process is effectively improved.

Figure 3:
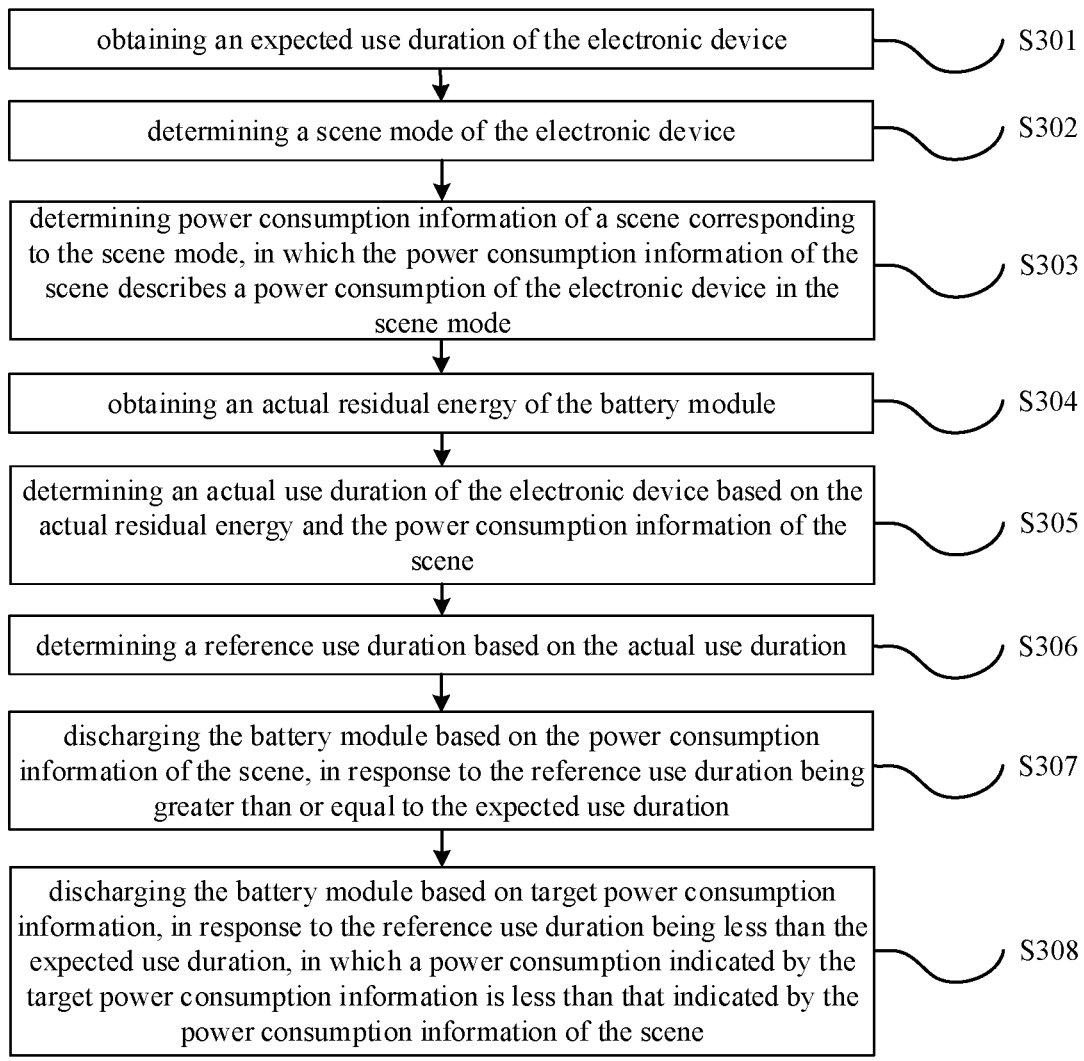
FIG. 3 is a flowchart of a method for controlling an electronic device provided in another embodiment of the present disclosure.

FIG. 3 is a schematic flowchart of a method for controlling an electronic device provided in another embodiment of the present disclosure.

As illustrated in FIG. 3, the method for controlling the electronic device includes as follows:

At S301, an expected use duration of the electronic device is obtained.

At S302, a scene mode of the electronic device is determined.

At S303, power consumption information of the scene corresponding to the scene mode is determined. The power consumption information of the scene describes a power consumption of the electronic device in the scene mode.

At S304, an actual residual energy of the battery module is obtained.

At S305, an actual use duration of the electronic device is determined based on the actual residual energy and the power consumption information of the scene.

Regarding the explanation of S301 to S305, reference may be made to the above embodiments, which will not be repeated here.

At S306, a reference use duration is determined based on the actual use duration.

The reference use duration refers to a use duration determined based on the actual use duration.

In the embodiment of the present disclosure, in the process of determining the reference use duration based on the actual use duration, temperature information of the electronic device is determined, and then the reference use duration is determined based on the temperature information and the actual use duration. Alternatively, touch information of the electronic device may be determined, and then the reference use duration may be determined based on the touch information and the actual use duration, which is not limited herein.

Alternatively, in some embodiments, in the process of determining the reference use duration based on the actual use duration, an elapsed duration after obtaining the expected use duration of the electronic device is determined, and a sum of the actual use duration and the elapsed duration may be determined as the reference use duration. Therefore, an error brought by the logic operation process may be effectively reduced, and therefore the accuracy of the obtained reference use duration for describing the use duration of the electronic device is effectively improved.

At S307, the battery module is discharged based on the power consumption information of the scene, in response to determining that the reference use duration being greater than or equal to the expected use duration.

In an embodiment of the present disclosure, it indicates that the expected use duration of the electronic device by the user may be met based on the power consumption information of the scene, when the reference use duration is greater than or equal to the expected use duration. At this time, the battery module is discharged based on the power consumption information of the scene, and thus the rationality of the control process of the electronic device may be effectively improved.

At S308, the battery module is discharged based on target power consumption information, in response to determining that the reference use duration being less than the expected use duration, in which the power consumption indicated by the target power consumption information is less than the power consumption indicated by the power consumption information of the scene.

The target power consumption information refers to the power consumption information that instructs the battery module to be discharged when the reference use duration is less than the expected use duration.

That is, in the embodiment of the present disclosure, after the actual use duration of the electronic device is determined based on the actual residual energy and the power consumption information of the scene, the reference use duration may be determined based on the actual use duration. If the reference use duration is greater than or equal to the expected use duration, the battery module is discharged based on the power consumption information of the scene. If the reference use duration is less than the expected use duration, the battery module is discharged based on the target power consumption information, in which the power consumption indicated by the target power consumption information is less than the power consumption indicated by the power consumption information of the scene. In this way, the indicated power consumption information of the battery module in the discharge control process may be flexibly determined based on the comparison result of the reference use duration and the expected use duration, and therefore the adaptability between the discharge control process and the application scene is effectively improved.

Figure 4:
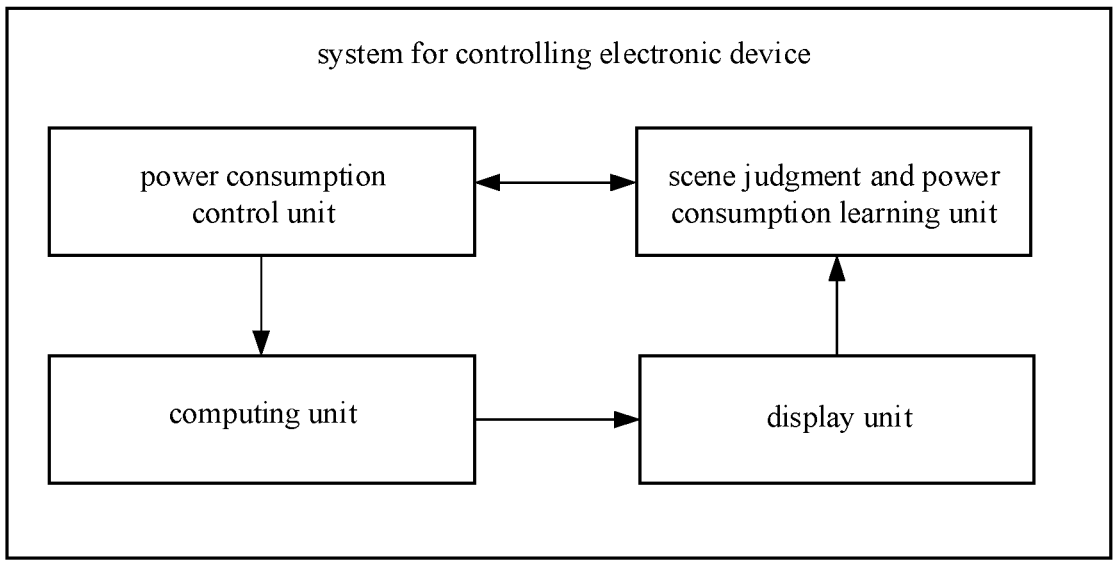
FIG. 4 is a schematic diagram of a system for controlling an electronic device provided in embodiments of the present disclosure.

For example, as illustrated in FIG. 4, which is a schematic diagram of a system for controlling an electronic device provided in embodiments of the present disclosure, the system for controlling the electronic device includes a power consumption control unit, a scene judgment and power learning unit, a computing unit and a display unit. A plurality of units may be electrically connected to each other and transmit data to each other based on the direction of arrows between the units.

The power consumption control unit may be configured to obtain current power consumption information of the electronic device and discharge the battery module. The scene judgment and power consumption learning unit may be configured to obtain a current scene mode of the electronic device and determine power consumption information of the scene corresponding to a scene. The computing unit may be configured to calculate a residual use duration of the electronic device in different scene modes. The display unit may be configured to display the residual use duration obtained by the computing unit, and the user may configure an expected use duration and the corresponding scene mode through the display unit.

In an embodiment of the present disclosure, a reference use duration is determined based on an actual use duration. If the reference use duration is greater than or equal to the expected use duration, the battery module is discharged based on power consumption information of the scene. If the reference use duration is less than the expected use duration, the battery module is discharged based on a target power consumption, in which a power consumption indicated by the target power consumption information is less than the power consumption indicated by the power consumption information of the scene. In this way, the indicated power consumption information of the battery module in the discharge control process may be flexibly determined based on the comparison result of the reference use duration and the expected use duration, and therefore the adaptability between the discharge control process and the application scene is effectively improved. By determining an elapsed duration after obtaining the expected use duration of the electronic device, and determining a sum of the actual use duration and the elapsed duration as the reference use duration, the error brought by the logic operation process may be effectively reduced, and therefore the accuracy of the description of the use duration of the electronic device by the reference use duration obtained is effectively improved.

Figure 5:
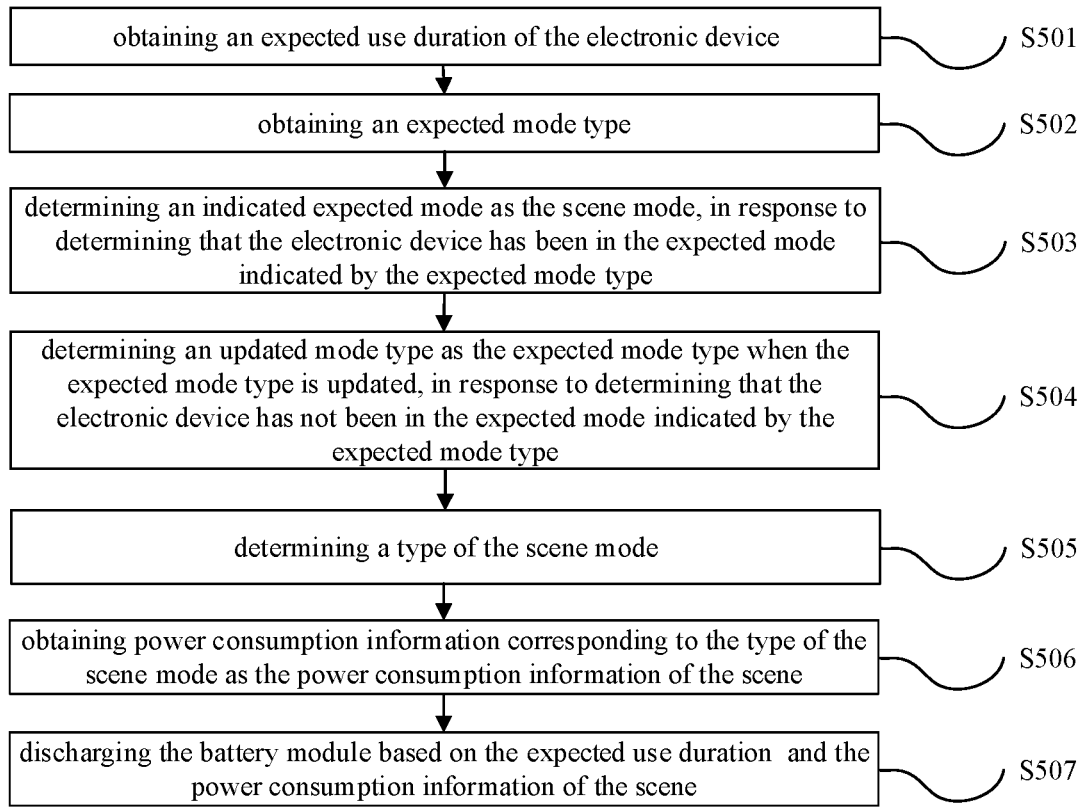
FIG. 5 is a flowchart of a method for controlling an electronic device provided in another embodiment of the present disclosure.

FIG. 5 is a schematic flowchart of a method for controlling an electronic device provided in another embodiment of the present disclosure.

As illustrated in FIG. 5, the method for controlling the electronic device includes as follows:

At S501, an expected use duration of the electronic device is obtained.

Regarding the explanation of S501, reference may be made to the above embodiments, which will not be repeated here.

At S502, an expected mode type is obtained.

The mode type refers to a type corresponding to the scene mode. The expected mode type refers to a mode type in which the user expects to execute the method of controlling the electronic device.

In an embodiment of the present disclosure, when the expected mode type is obtained, the expected mode type obtained may provide a reliable trigger basis for the power consumption adjustment process of the electronic device.

At S503, an indicated expected mode is determined as the scene mode, in response to determining that the electronic device has been in the expected mode indicated by the expected mode type.

In the embodiment of the present disclosure, when the electronic device is already in the expected mode indicated by the expected mode type, it indicates that the user expects the electronic device to perform a corresponding power consumption adjustment process at this moment. At this time, the expected mode indicated by the expected mode type is used as the scene mode, which may provide a timely retrieval basis for the subsequent determination of the scene mode type.

Alternatively, in some embodiments, after the indicated expected mode is determined as the scene mode, an actual residual energy of the battery module may be obtained, and expected power consumption information may be determined based on an expected use duration and the actual residual energy, in which the expected power consumption information indicates an expected power consumption. An actual power consumption of the electronic device is adjusted to the expected power consumption. Therefore, the expected power consumption information may be accurately and quickly determined based on the expected use duration and the actual residual energy. The reliability of the power consumption adjustment process of the electronic device is guaranteed based on the expected power consumption information, and therefore the effect of the power consumption adjustment of the electronic device is effectively improved.

The actual residual energy refers to residual electricity in the battery module at a current time point.

The expected power consumption refers to a power consumption of the electronic device determined based on the expected use duration and the actual residual energy. The expected power consumption information may refer to relevant information corresponding to the expected power consumption.

The actual power consumption refers to a current power consumption of the electronic device.

At S504, an updated mode type is determined as the expected mode type when the expected mode type is updated, in response to determining that the electronic device has not been in the expected mode indicated by the expected mode type.

The updated mode type refers to a mode type obtained after the expected mode type is updated.

That is, in an embodiment of the present disclosure, an expected mode type may be obtained after the expected use duration of the electronic device is obtained. The expected mode indicated is determined as the scene mode, in response to determining that the electronic device has been in the expected mode indicated by the expected mode type. An updated mode type is determined as the expected mode type when the expected mode type is updated, in response to determining that the electronic device has not been in the expected mode indicated by the expected mode type. Thus, the execution scene for discharging the battery module may be accurately controlled based on the expected mode type, and the expected mode type may be pre-configured and updated in real time. Therefore, the flexibility of the control process of the electronic device is effectively improved.

For example, the scene judgment and power consumption learning unit in FIG. 4 may read the scene mode of the electronic device, for example, it reads from a host the fact that the electronic device is currently in a game mode, a chat mode, a standby mode, etc. The scene judgment and power consumption learning unit may classify the scene modes in combination with the power consumption information in a current scene collected by the power consumption control unit, associate and combine each scene mode with the power consumption information of the scene, and learn the power consumption to adapt to the change in the power consumption information of the scene during use. The scene judgment and power consumption learning unit selects a corresponding scene mode type and power consumption information corresponding to the scene mode type, when the scene mode selected by the user is received.

At S505, a type of the scene mode is determined.

The type of the scene mode refers to a mode type corresponding to the scene mode.

It can be understood that there may be differences in the power consumption information corresponding to different types of scene modes. For example, the power consumption of a game mode may be higher than that of a music mode. By determining the type of the scene mode, reliable reference information may be provided for subsequent determination of the power consumption information of the scene.

At S506, the power consumption information corresponding to the type of the scene mode is obtained as the power consumption information of the scene.

In an embodiment of the present disclosure, in the process of obtaining the power consumption information corresponding to the type of the scene mode as the power consumption information of the scene, a corresponding generation model of power consumption information may be determined based on the type of the scene mode, and then relevant information of the electronic device is input into the generation model of power consumption information to determine the power consumption information of the scene corresponding to the type of the scene mode. Alternatively, the power consumption information corresponding to the type of the scene mode may be obtained as the power consumption information of the scene by combining numbers and shapes, which is not limited.

Alternatively, in some embodiments, in the process of obtaining the power consumption information corresponding to the type of the scene mode as the power consumption information of the scene, a reference mode type matching the type of the scene mode may be determined from a set correspondence list, in which the set correspondence list includes the reference mode type and reference power consumption information corresponding to the reference mode type. The reference power consumption information corresponding to the reference mode type is used as the power consumption information of the scene. Since the set correspondence list may be pre-configured based on application environment, the acquisition efficiency of the power consumption information of the scene may be effectively improved when the power consumption information of the scene is obtained based on the set correspondence list, and therefore the timeliness of discharging the battery module is effectively improved.

The set correspondence list may refer to a pre-configured relationship table, and the set correspondence list may be used to map the mapping relationship between the reference mode type and the reference power consumption information.

The reference mode type refers to a type of the scene mode pre-configured in the set correspondence list. The reference power consumption information refers to power consumption information corresponding to the reference mode type.

That is, in the embodiment of the present disclosure, after the scene mode is determined, the type of the scene mode may be determined, and the power consumption information corresponding to the type of the scene mode may be obtained as the power consumption information of the scene. Since the power consumption information corresponding to different types of scene modes may be different, the accuracy of the obtained power consumption information of the scene may be effectively improved, when the power consumption information of the scene is determined based on the type of the scene mode.

At S507, the battery module is discharged based on the expected use duration and the power consumption information of the scene.

Regarding the explanation of S507, reference may be made to the above embodiments, which will not be repeated here.

Figure 6:
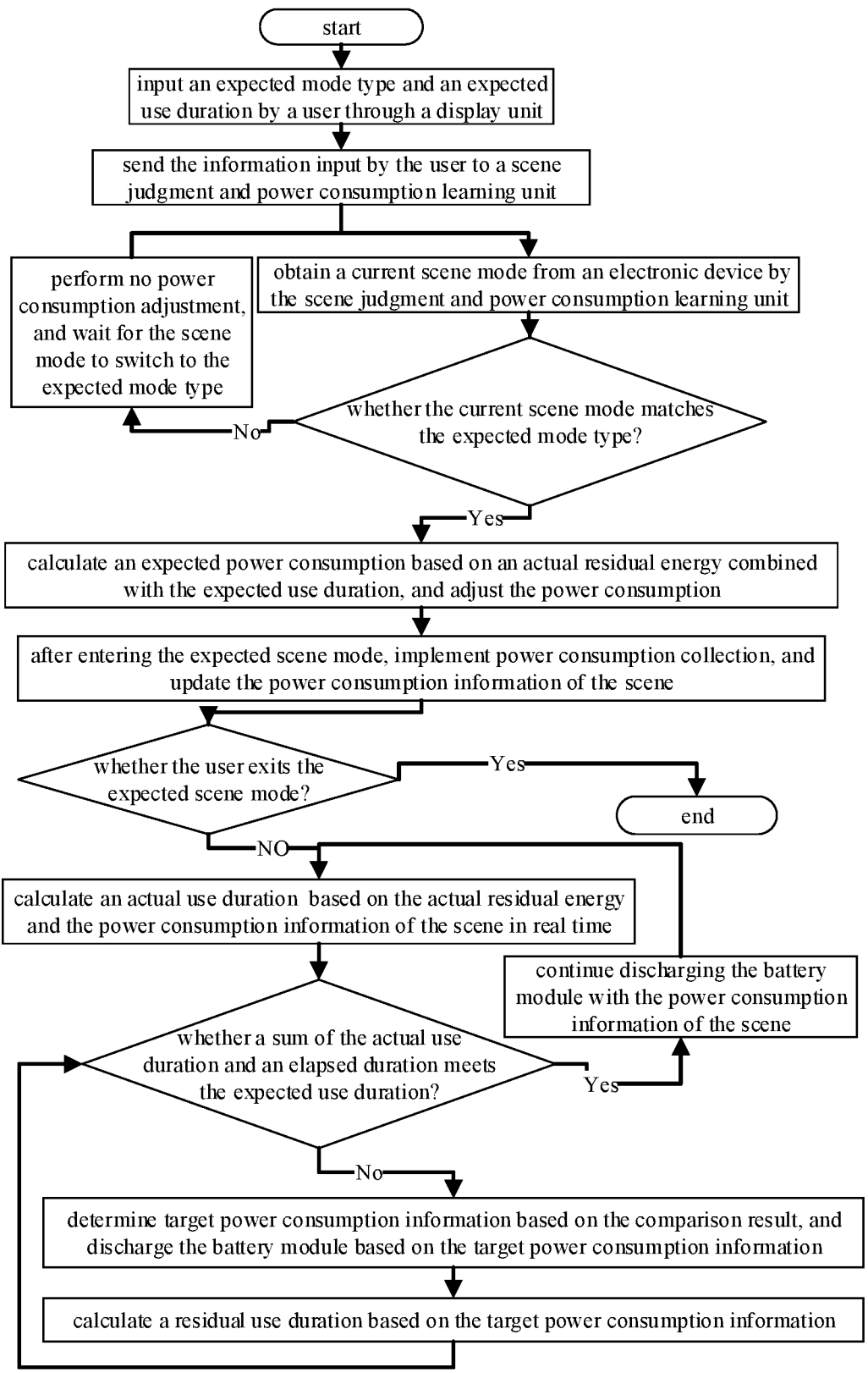
FIG. 6 is a flowchart of a process of controlling an electronic device provided in embodiments of the present disclosure.

FIG. 6 is a flowchart of a process of controlling an electronic device provided in embodiments of the present disclosure. The process includes as follows:

In the embodiment, an expected mode type may be obtained. An indicated expected mode is determined as a scene mode, in response to determining that the electronic device has been in the expected mode indicated by the expected mode type. An updated mode type is determined as the expected mode type when the expected mode type is updated, in response to determining that the electronic device has not been in the expected mode indicated by the expected mode type. Thus, the execution scene for discharging a battery module may be accurately controlled based on the expected mode type, and the expected mode type may be pre-configured and updated in real time, and therefore the flexibility of the control process of the electronic device is effectively improved. An actual residual energy of the battery module may be obtained, and expected power consumption information may be determined based on an expected use duration and the actual residual energy, the expected power consumption information indicates an expected power consumption, and an actual power consumption of the electronic device is adjusted to the expected power consumption. Therefore, the expected power consumption information may be accurately and quickly determined based on the expected use duration and the actual residual energy. The reliability of the power consumption adjustment process of the electronic device is guaranteed based on the expected power consumption information, and therefore the effect of the power consumption adjustment of the electronic device is effectively improved. The type of the scene mode may be determined, and the power consumption information corresponding to the type of the scene mode may be obtained as the power consumption information of the scene. Since the power consumption information corresponding to different types of scene modes may be different, the accuracy of the obtained power consumption information of the scene may be effectively improved, when the power consumption information of the scene is determined based on the type of the scene mode. A reference mode type matching the type of the scene mode may be determined from a set correspondence list, in which the set correspondence list includes the reference mode type and reference power consumption information corresponding to the reference mode type. The reference power consumption information corresponding to the reference mode type is used as the power consumption information of the scene. Since the set correspondence list may be pre-configured based on application environment, the acquisition efficiency of the power consumption information of the scene may be effectively improved when the power consumption information of the scene is obtained based on the set correspondence list, and therefore the timeliness of discharging the battery module is effectively improved.

Figure 7:
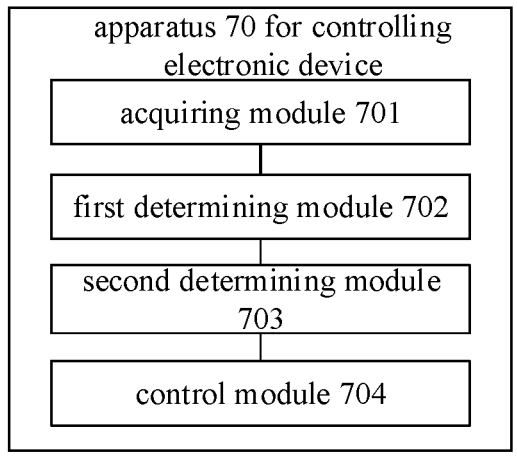
FIG. 7 is a schematic diagram of an apparatus for controlling an electronic device provided in an embodiment of the present disclosure.

FIG. 7 is a schematic diagram of an apparatus for controlling an electronic device provided in an embodiment of the present disclosure.

The electronic device includes a battery module. As illustrated in FIG. 7, the apparatus 70 for controlling the electronic device includes an acquiring module 701, a first determining module 702, a second determining module 703 and a control module 704.

The acquiring module 701 is configured to obtain an expected use duration of the electronic device.

The first determining module 702 is configured to determine a scene mode of the electronic device.

The second determining module 703 is configured to determine power consumption information of the scene corresponding to the scene mode, in which the power consumption information of the scene describes a power consumption of the electronic device in the scene mode.

The control module 704 is configured to discharge the battery module based on the expected use duration and the power consumption information of the scene.

Figure 8:
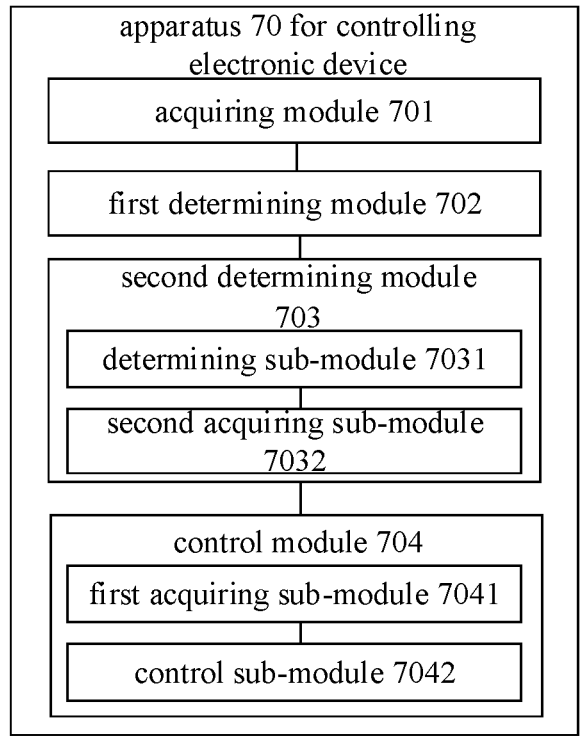
FIG. 8 is a schematic diagram of an apparatus for controlling an electronic device provided in another embodiment of the present disclosure.

In some embodiments of the present disclosure as illustrated in FIG. 8, which is a schematic diagram of an apparatus for controlling an electronic device provided in another embodiment of the present disclosure, the control module 704 includes a first acquiring sub-module 7041 and a control sub-module 7042.

The first acquiring sub-module 7041 is configured to obtain an actual residual energy of the battery module.

The control sub-module 7042 is configured to discharge the battery module based on the actual residual energy, the expected use duration and the power consumption information of the scene.

In some embodiments, the control sub-module 7042 is specifically configured to:
  determine an actual use duration of the electronic device based on the actual residual energy and the power consumption information of the scene; and
  discharge the battery module based on the expected use duration, the actual use duration and the power consumption information of the scene.

In some embodiments of the present disclosure, the control sub-module 7042 is further configured to:
  determine a reference use duration based on the actual use duration;
  discharge the battery module based on the power consumption information of the scene, in response to determining that the reference use duration being greater than or equal to the expected use duration;
  discharge the battery module based on target power consumption information, in response to determining that the reference use duration being less than the expected use duration, in which a power consumption indicated by the target power consumption information is less than that indicated by the power consumption information of the scene.

In some embodiments of the present disclosure, the control sub-module 7042 is further configured to:
  determine an elapsed duration after obtaining the expected use duration of the electronic device;
  determine a sum of the actual use duration and the elapsed duration as the reference use duration.

In some embodiments, the first determining module 702 is specifically configured to:
  obtain an expected mode type;

determine an indicated expected mode as the scene mode, in response to determining that the electronic device has been in the expected mode indicated by the expected mode type; and determine an updated mode type as the expected mode type when the expected mode type is updated, in response to determining that the electronic device has not been in the expected mode indicated by the expected mode type.

In some embodiments of the present disclosure, the first determining module 702 is further configured to:

obtain an actual residual energy of the battery module;

determine expected power consumption information based on the expected use duration and the actual residual energy, in which the expected power consumption information indicates an expected power consumption; and adjust an actual power consumption of the electronic device to the expected power consumption.

In some embodiments of the present disclosure, the second determining module 703 includes a determining sub-module 7031 and a second acquiring sub-module 7032.

The determining sub-module 7031 is configured to determine a type of the scene mode.

The second acquiring sub-module 7032 is configured to obtain power consumption information corresponding to the type of the scene mode as the power consumption information of the scene.

In some embodiments, the second acquiring sub-module 7032 is specifically configured to:

determine a reference mode type matching the type of the scene mode from a set correspondence list, in which the set correspondence list includes the reference mode type and reference power consumption information corresponding to the reference mode type; and determine the reference power consumption information corresponding to the reference mode type as the power consumption information of the scene.

It needs to be noted that the foregoing explanation of the method for controlling the electronic device is also applied to an apparatus for controlling the electronic device in the embodiment, which will not be repeated here.

In the embodiment of the present disclosure, an expected use duration of electronic device is obtained, and the scene mode of the electronic device is determined. Power consumption information of the scene corresponding to the scene mode is determined, in which the power consumption information of the scene describes a power consumption of the electronic device in the scene mode. The battery module is discharged based on the expected use duration and the power consumption information of the scene. Thus, the effect of discharging the battery module is effectively improved to obtain a more accurate residual use duration.

Figure 9:
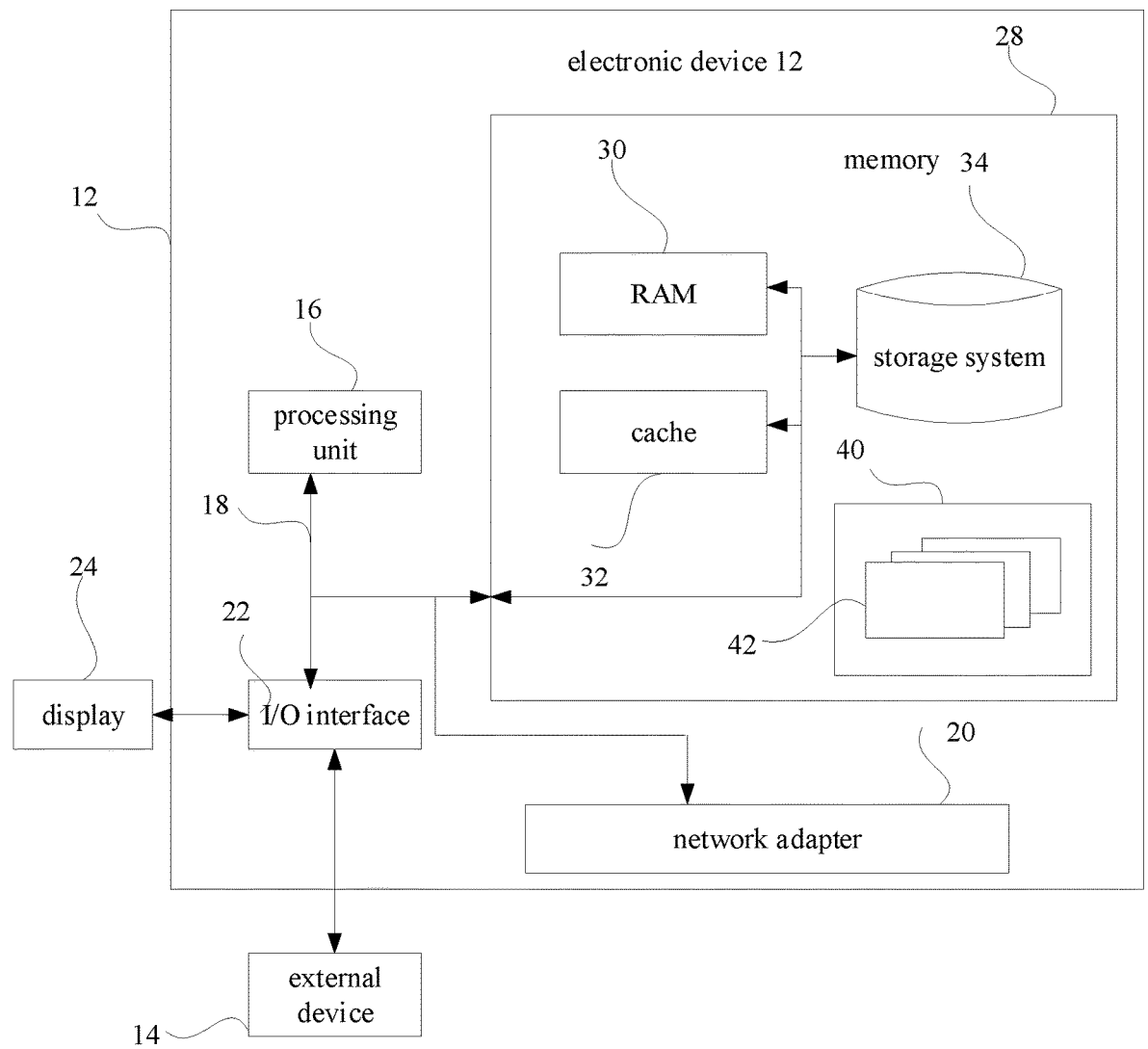
FIG. 9 is a block diagram of an electronic device configured to achieve an embodiment of the present disclosure.

FIG. 9 is a block diagram of an electronic device configured to achieve an embodiment of the present disclosure. The electronic device 12 illustrated in FIG. 9 is merely an example and cannot impose any limitation on the function and scope of use of the embodiments of the present disclosure.

As illustrated in FIG. 9, the electronic device 12 is represented in a form of a general-purpose computing device. The components of the electronic device 12 may include but are not limited to one or more processors or processing units 16, a memory 28, a bus 18 connecting different components (including the memory 28 and the processing units 16).

The bus 18 represents one or more of several bus structures, including a memory bus or a memory controller, a peripheral bus, a graphics acceleration port, a processor or a local bus using any bus architecture in a variety of bus architectures. For example, these architectures include but are not limited to an industry standard architecture (ISA) bus, an micro channel architecture (MCA) bus, an enhanced ISA bus, a video electronics standards association (VESA) local bus and a peripheral component interconnection (PCI) bus.

The electronic device 12 typically includes a variety of computer readable media. These media may be any available media that may be accessed by the electronic device 12, including volatile and non-volatile media, and removable and non-removable media.

The memory 28 may include computer readable media in the form of a volatile memory, such as a random access memory (RAM) 30 and/or a cache 32. The electronic device 12 may further include other removable/non-removable, volatile/non-volatile computer storage media. As an example, a storage system 34 may be used to read or write non-removable, non-volatile magnetic media (not shown in FIG. 9, commonly referred to as a "hard disk drive").

Although not illustrated in FIG. 9, a disk driver for reading or writing removable non-volatile disks (for example, "a floppy disk"), and an optical disc driver for reading or writing removable non-volatile discs (such as a compact disc read only memory (CD-ROM), a digital video disc read only memory (DVD-ROM) or other optical media) may be provided. In these cases, each driver may be connected to the bus 18 through one or more data medium interfaces. The memory 28 may store at least one program product, which has a set of (for example, at least one) program modules that are configured to perform the functions of the embodiments of the present disclosure.

A program/utility 40 with a set of (at least one) program modules 42 may be stored in, for example, the memory 28. Such a program module 42 includes but is not limited to an operating system, one or more applications, other program modules and program data. Each or a combination of these examples may include implementations of a network environment. The program module 42 typically performs the functions and/or methods in the embodiments described in the present disclosure.

The electronic device 12 may also communicate with one or more external devices 14 (such as a keyboard, a pointing device, a display 24, etc.), with one or more devices that enable a human body to interact with the electronic device 12, and/or with any device that enables the electronic device 12 to communicate with one or more other computing devices (such as network cards, modems, etc.). This communication may be performed through an input/output (I/O) interface 22. Moreover, the electronic device 12 may also communicate with one or more networks (such as a local area network (LAN), a wide area network (WAN) and/or a public network, for example, the Internet) through a network adapter 20. As illustrated in FIG. 9, the network adapter 20 communicates with other modules of the electronic device 12 through the bus 18. It can be understood that, although not shown in FIG. 9, other hardware and/or software modules may be used in conjunction with the electronic device 12, including but not limited to: microcode, device drivers, redundant processing units, external disk drive arrays, redundant arrays of independent disks (RAID) systems, tape drives, and data backup storage systems.

The processing unit 16 performs various functional applications and data processing by running programs stored in the memory 28, such as implementing methods for controlling electronic devices mentioned in the preceding embodiments.

In order to achieve the above embodiments, the present disclosure further provides a non-transitory computer readable storage medium stored with a computer program thereon, and the program performs the method for controlling the electronic device as described in the above embodiments when performed by a processor.

In order to achieve the above embodiments, the present disclosure further provides a computer program product. The instructions in the computer program product are executed by a processor so as to execute the method for controlling the electronic device as described in the above embodiments.

After considering the specification and practicing the present disclosure herein, those skilled in the art will easily think of other embodiments of the present disclosure. The present disclosure is intended to cover any variations, usages, or adaptive changes of the present disclosure. These variations, usages, or adaptive changes follow the general principles of the present disclosure and include common knowledge or conventional technical means in the technical field not disclosed by the present disclosure. The specification and embodiments are only illustrative, and the true scope and spirit of the present disclosure are indicated by the following claims.

It can be understood that the present disclosure is not limited to the precise structure described above and shown in the drawings, and various modifications and changes may be made without departing from its scope. The scope of the present disclosure is merely limited by the appended claims.

In addition, the terms "first" and "second" are merely for describing purposes and are not to be construed as indicating or implying relative importance or implicitly indicating the number of technical features indicated. In the description of the present disclosure, "a plurality of" means two or more than two, unless otherwise expressly and specifically stated.

Any process or method described in the flowchart or otherwise described herein can be understood as representing one or more modules, segments, or portions of codes of executable instructions for implementing the blocks of a specific logical function or process, and the scope of the embodiments of the present disclosure includes additional implementations, in which the functions may be executed not in the sequence shown or discussed, including in a substantially simultaneous manner or in a reverse sequence, which will be appreciated by those skilled in the art the embodiments of the present disclosure belong to.

It can be understood that all parts of the present disclosure may be implemented with a hardware, a software, a firmware and their combination. In the above embodiment, a plurality of blocks or methods may be implemented with a software or a firmware stored in a memory and executed by a suitable system for executing instructions. For example, if implemented with a hardware, they may be implemented by any of the following technologies or their combinations known in the art as in another implementation: a discrete logic circuit with logic gate circuits configured to perform logic functions on data signals, an application specific integrated circuit with appropriate combined logic gate circuits, a programmable gate array (PGA), a field programmable gate array (FPGA), etc.

Those skilled in the art may understand that all or part of blocks in the above method embodiments may be implemented by instructing relevant hardware by computer programs. The programs may be stored in a computer readable storage medium, and the programs may include one of blocks of the method embodiments or their combination when executed.

In addition, functional units in the embodiments of the present disclosure may be integrated in one processing module, or each of the units may physically exist alone, or two or more units may be integrated in one module. The integrated module may be implemented in a form of a hardware, and also may be implemented in a form of a software functional module. The integrated module may be stored in a computer readable storage medium when it is implemented in a form of a software functional module and sold or used as an independent product.

The above storage medium may be a read-only memory, a magnetic disk or an optical disk.

In the present disclosure, descriptions with reference to terms "one embodiment", "some embodiments", "an example", "a specific example" or "some examples" mean specific features, structures, materials or characteristics described in combination with the embodiment or example are included in at least one embodiment or example of the present disclosure. The schematic representations of the above terms do not have to be the same embodiment or example. Moreover, specific features, structures, materials or characteristics described may be combined in any one or more embodiments or examples in a suitable manner.

Although embodiments of the present disclosure have been illustrated and described above, it can be understood that the above embodiments are illustrative and may not be construed as a limitation on the present disclosure, and changes, modifications, substitutions and variations may be made to the above embodiments within the scope of the present disclosure.

What is claimed is:

1. A method for controlling an electronic device, wherein, the electronic device comprises a battery module, and the method comprises:
obtaining an expected use duration of the electronic device;
determining a scene mode of the electronic device;
determining power consumption information of a scene corresponding to the scene mode, wherein the power consumption information of the scene describes a power consumption of the electronic device in the scene mode;
obtaining an actual residual energy of the battery module;
determining an actual use duration of the electronic device based on the actual residual energy and the power consumption information of the scene;
determining a reference use duration based on the actual use duration;
discharging the battery module based on the power consumption information of the scene, in response to determining that the reference use duration being greater than or equal to the expected use duration; and
discharging the battery module based on target power consumption information, in response to determining that the reference use duration being less than the expected use duration, wherein a power consumption indicated by the target power consumption information is less than that indicated by the power consumption information of the scene.

2. The method of claim 1, wherein, determining the reference use duration based on the actual use duration comprises:
determining an elapsed duration after obtaining the expected use duration of the electronic device; and determining a sum of the actual use duration and the elapsed duration as the reference use duration.

3. The method of claim 1, wherein determining a scene mode of the electronic device comprises:
obtaining an expected mode type;
determining an indicated expected mode as the scene mode, in response to determining that the electronic device has been in the expected mode indicated by the expected mode type; and
determining an updated mode type as the expected mode type when the expected mode type is updated, in response to determining that the electronic device has not been in the expected mode indicated by the expected mode type.

4. The method of claim 3, after determining the indicated expected mode as the scene mode, further comprising:
obtaining an actual residual energy of the battery module;
determining expected power consumption information based on the expected use duration and the actual residual energy, wherein the expected power consumption information indicates an expected power consumption; and
adjusting an actual power consumption of the electronic device to the expected power consumption.

5. The method of claim 1, wherein, determining power consumption information of the scene corresponding to the scene mode comprises:
determining a type of the scene mode;
obtaining power consumption information corresponding to the type of the scene mode as the power consumption information of the scene.

6. The method of claim 5, wherein, obtaining the power consumption information corresponding to the type of the scene mode as the power consumption information of the scene comprises:
determining a reference mode type matching the type of scene mode from a set correspondence list, wherein the set correspondence list comprises the reference mode type and reference power consumption information corresponding to the reference mode type; and
determining the reference power consumption information corresponding to the reference mode type as the power consumption information of the scene.

7. An electronic device, comprising:
a battery module;
at least one processor; and
a memory communicatively connected to the at least one processor, wherein, the memory is stored with instructions executable by the at least one processor, and the processor is configured to:
obtain an expected use duration of the electronic device;
determine a scene mode of the electronic device;
determine power consumption information of a scene corresponding to the scene mode, wherein the power consumption information of the scene describes a power consumption of the electronic device in the scene mode;
obtain an actual residual energy of the battery module;
determine an actual use duration of the electronic device based on the actual residual energy and the power consumption information of the scene;
determine a reference use duration based on the actual use duration;
discharge the battery module based on the power consumption information of the scene, in response to determining that the reference use duration being greater than or equal to the expected use duration; and
discharge the battery module based on target power consumption information, in response to determining that the reference use duration being less than the expected use duration, wherein a power consumption indicated by the target power consumption information is less than that indicated by the power consumption information of the scene.

8. The electronic device of claim 7, wherein, the processor is configured to:
determine an elapsed duration after obtaining the expected use duration of the electronic device; and
determine a sum of the actual use duration and the elapsed duration as the reference use duration.

9. The electronic device of claim 7, wherein, the processor is configured to:
obtain an expected mode type;
determine an indicated expected mode as the scene mode, in response to determining that the electronic device has been in the expected mode indicated by the expected mode type; and
determine an updated mode type as the expected mode type when the expected mode type is updated, in response to determining that the electronic device has not been in the expected mode indicated by the expected mode type.

10. The electronic device of claim 9, wherein, the processor is configured to:
obtain an actual residual energy of the battery module;
determine expected power consumption information based on the expected use duration and the actual residual energy, wherein the expected power consumption information indicates an expected power consumption; and
adjust an actual power consumption of the electronic device to the expected power consumption.

11. The electronic device of claim 7, wherein, the processor is configured to:
determine a type of the scene mode;
obtain power consumption information corresponding to the type of the scene mode as the power consumption information of the scene.

12. The electronic device of claim 11, wherein, the processor is configured to:
determine a reference mode type matching the type of scene mode from a set correspondence list, wherein the set correspondence list comprises the reference mode type and reference power consumption information corresponding to the reference mode type; and
determine the reference power consumption information corresponding to the reference mode type as the power consumption information of the scene.

13. A non-transitory computer readable storage medium stored with computer instructions, wherein, the computer instructions are configured to cause a computer to perform a method for controlling an electronic device, wherein the method comprises:
obtaining an expected use duration of the electronic device;
determining a scene mode of the electronic device;
determining power consumption information of a scene corresponding to the scene mode, wherein the power consumption information of the scene describes a power consumption of the electronic device in the scene mode;
obtaining an actual residual energy of the battery module;

determining an actual use duration of the electronic device based on the actual residual energy and the power consumption information of the scene;

determining a reference use duration based on the actual use duration;

discharging the battery module based on the power consumption information of the scene, in response to determining that the reference use duration being greater than or equal to the expected use duration; and discharging the battery module based on target power consumption information, in response to determining that the reference use duration being less than the expected use duration, wherein a power consumption indicated by the target power consumption information is less than that indicated by the power consumption information of the scene.

* * * * *